(12) United States Patent
Takase (10) Patent No.: US 9,857,615 B2
(45) Date of Patent: Jan. 2, 2018

(54) LIGHT SOURCE DEVICE AND DISPLAY DEVICE

(71) Applicant: Sharp Kabushiki Kaisha, Osaka-shi, Osaka (JP)

(72) Inventor: Kenji Takase, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 122 days.

(21) Appl. No.: 14/889,537

(22) PCT Filed: Feb. 26, 2014

(86) PCT No.: PCT/JP2014/054754
§ 371 (c)(1),
(2) Date: Nov. 6, 2015

(87) PCT Pub. No.: WO2014/182345
PCT Pub. Date: Dec. 4, 2014

(65) Prior Publication Data
US 2016/0085112 A1    Mar. 24, 2016

(30) Foreign Application Priority Data
May 31, 2013   (JP) .............................. 2013-115522

(51) Int. Cl.
*G02F 1/1333*   (2006.01)
*F21V 15/01*    (2006.01)
*F21Y 105/00*   (2016.01)

(52) U.S. Cl.
CPC ........ *G02F 1/133308* (2013.01); *F21V 15/01* (2013.01); *F21Y 2105/00* (2013.01);
(Continued)

(58) Field of Classification Search
None
See application file for complete search history.

(56) References Cited

U.S. PATENT DOCUMENTS

2004/0252254 A1* 12/2004 Koo ................... G02F 1/133308
349/58
2005/0094052 A1*  5/2005 Sakurai ............. G02F 1/133308
349/58
(Continued)

FOREIGN PATENT DOCUMENTS

CN       102257549 A    11/2011
CN       102608788 A     7/2012
(Continued)

OTHER PUBLICATIONS

Official Communication issued in International Patent Application No. PCT/JP2014/054754, dated Jun. 3, 2014.

*Primary Examiner* — Ryan Crockett
(74) *Attorney, Agent, or Firm* — Keating & Bennett, LLP (57) ABSTRACT

Provided are a light source device and a display device with an assembly constitution that can reduce the size of a frame and make the frame less conspicuous. A light source device is constituted such that a front cabinet having a U-shaped cross-section and a front cover are attached as a unit on an outer peripheral part of a backlight unit, and A display device is constituted such that the front cabinet having a U-shaped cross-section and the front cover are attached as a unit on an outer peripheral part of a liquid-crystal unit, a lens cover is attached by joining joining-groove parts to lens fixing claws provided on the front cabinet and the peripheral edge part of the lens cover is held by a pressing piece on the front cover.

10 Claims, 4 Drawing Sheets

(52) U.S. Cl.
CPC .............. *G02F 2001/13332* (2013.01); *G02F 2001/133317* (2013.01); *G02F 2001/133331* (2013.01)

(56) References Cited

U.S. PATENT DOCUMENTS

| | | | |
|---|---|---|---|
| 2011/0242686 A1* | 10/2011 | Watanabe | G02B 17/0884 359/804 |
| 2012/0162875 A1 | 6/2012 | Shimomichi | |
| 2012/0250289 A1* | 10/2012 | Kao | G02F 1/133308 362/97.1 |
| 2013/0021778 A1* | 1/2013 | Huang | G06F 1/1626 362/97.1 |
| 2013/0135804 A1 | 5/2013 | Takechi et al. | |
| 2013/0265519 A1 | 10/2013 | Yu | |
| 2015/0138484 A1* | 5/2015 | Watanabe | G02F 1/133308 349/58 |

FOREIGN PATENT DOCUMENTS

| | | |
|---|---|---|
| JP | 06-51006 U | 7/1994 |
| JP | 2000-112387 A | 4/2000 |
| JP | 2008-083562 A | 4/2008 |
| JP | 2010-003664 A | 1/2010 |
| JP | 2012-138842 A | 7/2012 |
| JP | 2013-064902 A | 4/2013 |
| WO | 2010/070871 A1 | 6/2010 |
| WO | 2012/008033 A1 | 1/2012 |

* cited by examiner

LIGHT SOURCE DEVICE AND DISPLAY DEVICE

TECHNICAL FIELD

The present invention relates to: a light source device that is obtained by unitarily assembling a backlight unit, a front cabinet, and a front cover; and a display device that is obtained by unitarily assembling a liquid crystal panel unit including a backlight, a front cabinet, and a front cover.

BACKGROUND ART

In recent years, as light emission efficiency improves and light emission amount increases, a light source device is being put in practical use which uses an LED (light emitting diode) that has a long life, small power consumption, and is environmentally friendly. Besides, as a light source device that is used as a backlight of a liquid crystal display device and the like, conventionally, a CCFL (cold cathode fluorescent lamp) was the most common But, because of progress in the LED technology in recent years, an LED starts being used as a light source portion in place of the CCFL.

Besides, by using such an LED, it becomes possible to achieve thickness reduction and light weight of a light source device and display device. Further, because the LED has an energy saving effect, a long time use becomes possible by using a predetermined-capacity battery.

Because of this, application to a mobile tablet terminal which uses such a light source device and a display device is underway. And, by incorporating a tuner into such a display device, it is possible to obtain a liquid crystal television that achieves energy saving, thickness reduction, and light weight.

To obtain a mobile terminal that achieves small size and light weight, is easy to mobile and has good viewing, it is preferable that an entire display surface is an image display screen. In other words, in a light source device obtained by unitarily assembling a backlight unit, a front cabinet and a front cover, and in a display device obtained by unitarily assembling a liquid crystal panel unit including a backlight, a front cabinet and a front cover, an assembly structure is desirable which can achieve a narrow frame in such a way that the entire surface becomes a display screen.

For example, as to display devices such as a liquid crystal television and the like, by using a fitting type front cabinet and front cover, efficient assembling is attempted, and a display device is already proposed, in which either one of the front cabinet and front cover is provided with a grove portion, the groove portion is provided with a plurality of claw portions opposing each other, the other one is provided with a tongue piece portion having hole portions that engage with the claw portions, and the front cabinet and the front cover are assembled by fitting to each other (e.g, patent literature 1).

CITATION LIST

Patent Literature

PLT1: JP-A-2008-83562

SUMMARY OF INVENTION

Technical Problem

The assembly structure described in the above patent literature 1 is a structure in which either of the front cabinet and front cover is provided with the groove portion whose circumferential edge portion includes a plurality of claw portions that oppose each other, the other one is provided with the tongue piece portion having the hole portions that engage with the claw portions, and the front cabinet and the front cover are assembled by fitting to each other. Accordingly, it becomes more difficult to achieve a narrow frame because a space for disposing the groove portion and the tongue piece portion is required.

Therefore, it is desirable that an assembly structure can achieve a narrower frame, and desirable that a light source device and a display device can make the frame inconspicuous and have a good appearance.

Because of this, in light of the above problems, it is an object of the present invention to provide a light source device and display device that have an assembly structure which can achieve a narrow frame and make the frame inconspicuous.

Solution to Problem

To achieve the above object, the present invention is a light source device composed by unitarily mounting a front cabinet and a front cover onto a backlight unit, the light source device includes: the front cabinet that is formed into a C-shape in cross-section fittable in each edge of the backlight unit and is provided with a lens fixing claw; a lens cover that has an engagement groove portion into which the lens fixing claw is fitted, the lens cover being mounted on a surface of the backlight unit; and the front cover that is formed into a C-shape in cross-section fitted to and mounted on an outer portion of the front cabinet, and is provided with a pressing piece that engages with a circumferential edge portion of the lens cover.

According to this structure, the front cabinet and front cover having the C-shape in cross-section are mounted onto an outer circumferential portion of the backlight unit, the engagement groove portion is engaged with the lens fixing claw disposed on the front cabinet to mount the lens cover, and the circumferential edge portion of the lens cover is pressed by the pressing piece disposed on the front cover. Accordingly, even in the structure in which the front cabinet and front cover having the C-shape in cross-section are fitted to and mounted on the outer circumferential portion of the backlight unit, it is possible to perform the unitary fixing via the lens cover. Besides, a frame portion is formed by the pressing piece of the front cover that is exposed to the circumferential edge portion of the lens cover. Accordingly, it is possible to make the frame portion as small as about a width of the pressing piece. Therefore, it is possible to obtain the light source device that has an assembly structure which can achieve a narrow frame and make the frame inconspicuous.

Besides, the present invention is a display device composed by unitarily mounting a front cabinet and a front cover onto a liquid crystal panel unit that includes a backlight, the display device includes: the front cabinet that is formed into a C-shape in cross-section fitted in each edge of the liquid crystal panel unit and is provided with a lens fixing claw; a lens cover that has an engagement groove portion into which the lens fixing claw is fitted, the lens cover being mounted on a surface of the liquid crystal panel unit; and the front cover that is formed into a C-shape in cross-section fitted in and mounted on an outer portion of the front cabinet, and is provided with a pressing piece that engages with a circumferential edge portion of the lens cover.

According to this structure, the front cabinet and front cover having the C-shape in cross-section are mounted on an outer circumferential portion of the liquid crystal panel unit, the engagement groove portion is engaged with the lens fixing claw disposed on the front cabinet to mount the lens cover, and the circumferential edge portion of the lens cover is pressed by the pressing piece disposed on the front cover. Accordingly, it is possible to obtain the display device that can make the frame portion as small as about a width of the pressing piece of the front cover.

Advantageous Effects of Invention

According to the present invention, the light source device is obtained which has the structure in which the front cabinet and front cover having the C-shape in cross-section are mounted on the outer circumferential portion of the backlight unit, the engagement groove portion is engaged with the lens fixing claw disposed on the front cabinet to mount the lens cover, and the circumferential edge portion of the lens cover is pressed by the pressing piece disposed on the front cover, and the display device is obtained which has the structure in which the front cabinet and front cover having the C-shape in cross-section are mounted on the outer circumferential portion of the liquid crystal panel unit, the engagement groove portion is engaged with the lens fixing claw disposed on the front cabinet to mount the lens cover, and the circumferential edge portion of the lens cover is pressed by the pressing piece disposed on the front cover. Accordingly, it is possible to obtain the light source device and display device that can make the frame portion as small as about the width of the pressing piece. Therefore, it is possible to obtain the light source device and display device that have the assembly structure which can achieve the narrow frame and make the frame inconspicuous.

DESCRIPTION OF EMBODIMENTS

Hereinafter, embodiments of the present invention are described with reference to the drawings, but the present invention is not limited to this. Besides, the same constituent members are indicated by the same reference numbers, and double description is suitably skipped.

Figure 1:
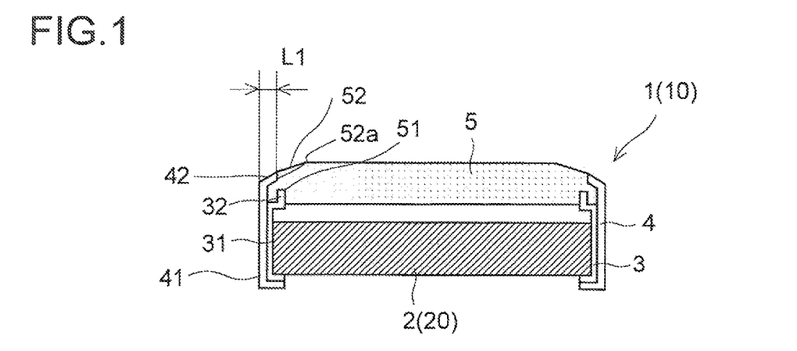
FIG. 1 is a schematic cross-sectional view showing structures of a light source device and display device according to the present invention.

As shown in a schematic cross-sectional view of FIG. 1, a light source device 1 according to the present embodiment is composed by unitarily mounting a front cabinet 3 and a front cover 4 onto a backlight unit 2. Besides, likewise, as shown in FIG. 1, a display device 10 according to the present embodiment is composed by unitarily mounting the front cabinet 3 and the front cover 4 onto a liquid crystal panel unit 20. In other words, the light source device 1 and the display device 10 have the same cross-sectional structure. Because of this, first, the light source device 1 according to the present embodiment is described by using FIG. 1 and FIG. 2.

As shown in FIG. 1, the light source device 1 according to the present embodiment is a light source device that is composed by unitarily mounting the front cabinet 3 and the front cover 4 onto the backlight unit 2. Besides, the front cabinet 3 is formed into a C-shape in cross-section fitted to each edge of the backlight unit 2, and the front cover 4 is formed into a C-shape in cross-section fitted to and mounted on an outer portion of the front cabinet 3.

Besides, a lens cover 5, which serves as a light emitting surface (display surface) and a protection member, is mounted on a front side of the backlight unit 2, and is composed to unitarily hold the backlight unit via the front cabinet 3 and the front cover 4. For example, the front cabinet 3 is provided with a lens fixing claw 32, the lens cover 5 is provided with an engagement groove portion 51 into which the lens fixing claw 32 is fitted, and the lens fixing claw 32, which is disposed on each front cabinet 3 mounted on each edge of the backlight unit 2, is engaged with the engagement groove portion 51 to mount the lens cover 5.

It is preferable that at least one lens fixing claw 32 or a plurality of lens fixing claws 32 (e.g., two) are disposed on the front cabinet 3 mounted on each edge. Besides, the structure is employed, in which the front cover 4 is provided with a pressing piece 42 that engages with a circumferential edge portion of the lens cover 5; and the pressing piece 42 and the above lens fixing claw 32 grip the lens cover 5.

Figure 2:
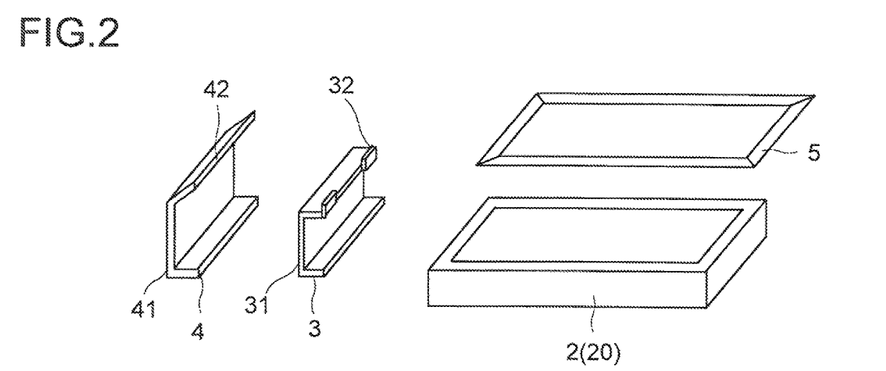
FIG. 2 is a decomposition perspective view showing structures of a light source device and display device according to the present invention.

In other words, as shown in a decomposition perspective view of FIG. 2, a structure is employed, in which the front cabinet 3 includes a main body portion 31 having a C-shape in cross-section, and a plurality of lens fixing claws 32 that protrude upward form an upper end portion of the main body portion 31; and the front cover 4 includes a main body portion 41 having a C-shape in cross-section, and the pressing piece 42 that is inclined diagonally upward form an upper end portion of the main body portion 41.

The lens cover 5 is formed of, for example, a rectangular plate-shaped transparent member or semi-transparent member, and is provided, along the rectangular circumferential edge portion, with the engagement groove portion 51 into which the lens fixing claw 32 is fitted. Besides, a structure is employed, in which an outer shape of the circumferential edge portion of the lens cover 5 is an inclined surface 52; and the pressing piece 42 inclined diagonally upward engages with and presses the inclined surface 52. Besides, a structure may be employed, in which a surface 52a to be engaged is provided on a portion of the inclined surface 52; and the pressing piece 42 engages with and presses the surface 52a to be engaged.

As described above, the light source device 1 according to the present embodiment is composed by unitarily mounting the front cabinet 3, the front cover 4 and the lens cover 5 onto the backlight unit 2. Accordingly, even in the simple structure in which the front cabinet 3 and front cover 4 having the C-shape in cross-section are fitted to each edge of the backlight unit 2, it becomes possible to assemble a unitary frame structure via the lens cover 5.

Besides, a frame portion is formed by engaging the pressing piece 42 with the circumferential edge portion of the lens cover 5. Accordingly, a width of the frame portion is equal to a width of the pressing piece 42. At the same time, the circumferential edge portion of the lens cover 5 is formed into the inclined surface 52, and the pressing piece 42 is pressed against the inclined surface 52. Accordingly, The pressing piece 42 has an attitude that is incline obliquely upward with respect to the surface of the backlight unit 2 defining a horizontal direction, and it is possible to make the width (visual width L1) of the frame portion in a front view inconspicuous. Besides, it is possible to make the frame width appear narrower by means of a lens effect of the inclined surface 52.

For example, as shown in FIG. 1, it is possible to make the frame portion as small as about the visual width L1 of the pressing piece 42 of the front cover 4 mounted on a side portion of the backlight unit 2. Besides, the front cabinet 3 and the front cover 4 are directly overlaid and mounted on the side portion of the backlight unit 2. Accordingly, it is also possible to curb the width of the frame portion to about a plate thickness of both members. In other words, in the light source device 1 according to the present embodiment, it is possible to achieve a narrow frame that has a thickness equal to about a sum thickness of plate thicknesses of the front cabinet 3 and front cover 4 that are mounted on the side portion of the backlight unit 2.

The backlight unit 2 is a unit member that includes a light source member such as an LED or the like, an electric member that controls light emission from the light source member, a light guide plate and an optical sheet that form light emitted from the light source member into predetermined illumination light, and is unitarily composed.

The light source device 1, which is composed by unitarily mounting the front cabinet 3, the front cover 4 and the lens cover 5 onto the backlight unit 2, has an appearance in which the pressing piece 42 of the front cover 4 is disposed on the circumferential edge portion of the lens cover 5.

Figure 3:
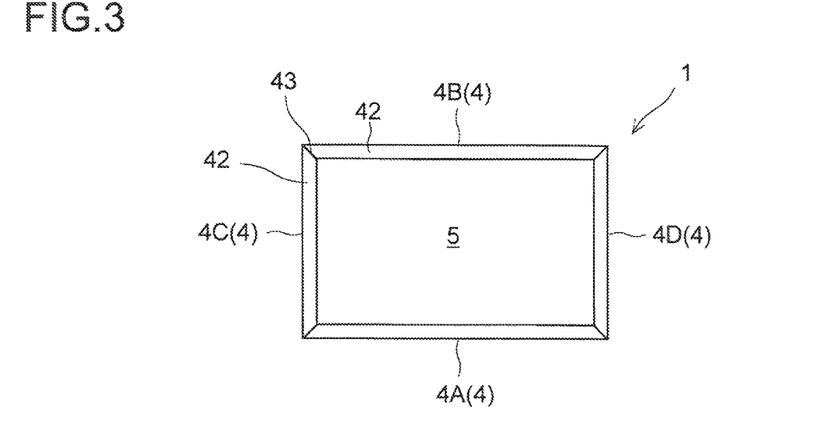
FIG. 3 is a front view showing appearances of a light source device and display device according to the present invention.

Because of this, in a case where a shape of the backlight unit 2 is rectangular, as shown in FIG. 3, the appearance of the light source device 1 has a structure in which the front cover 4 (4A-4D) is disposed on four edges of the rectangular lens cover 5 and the pressing piece 42 forms the frame portion.

Accordingly, the pressing piece 42 of the front cover 4 (4A-4D) is visually recognized as the frame portion of the light source device 1. For example, the front cover 4A is disposed on a lower edge portion of the light source device 1, the front cover 4B is disposed on an upper edge portion, the front covers 4C and 4D are disposed on left and right edge portions. For example, as shown in the figure, it is preferable that respective butting portions 43 of the pressing portions 42 are cut diagonally to one another to form corner portions that are recognized visually good.

As described above, the structure is employed, in which the pressing piece 42 of the front cover 4 (4A-4D) is visually recognized as the frame portion of the light source device 1. Accordingly, it is possible to make the frame portion as small as about the width of the pressing portion 42 of the front cover 4. Besides, by employing the structure in which the pressing piece 42 is inclined obliquely upward with respect to the unit surface defining the horizontal direction, it is possible to make the width (visual width L1) of the frame in the front view seeing the unit surface from the front look narrow and inconspicuous.

Besides, heat generated from the backlight unit 2 is dispersed via the front cabinet 3 to both a rear surface of the backlight unit 2 and the front cover 4 to be radiated. Accordingly, temperature of the front cover 4 serving as an exterior member of the light source device 1 is decreased, and it is possible to curb a low-temperature burn at a touchable portion.

Next, a display device 10 according to the present embodiment is described by using the FIG. 1. The display device 10 according to the present embodiment is different in that the above light source device 1 has a liquid crystal panel unit 20 in place of the backlight unit 2. Because the other structures are the same, detailed description is skipped. In other words, the display device 10 is composed by unitarily mounting the front cabinet 3, the front cover 4 and the lens cover 5 onto the liquid crystal panel unit 20. The liquid crystal panel unit 20 is a unit member that unitarily includes a liquid crystal panel in addition to the above backlight unit 2.

Also in the display device 10, a structure is employed, in which the front cabinet 3 and front cover 4 having the C-shape in cross-section are mounted on an outer circumferential portion of the liquid crystal panel unit 20; the engagement groove portion 51 is engaged with the lens fixing claw 32 disposed on the front cabinet 3 to mount the lens cover 5; and the circumferential edge portion of the lens cover 5 is pressed by the pressing piece 42. Accordingly, it is possible to obtain the display device 10 that has an assembly structure which is able to make the frame portion as small as about the width of the pressing piece 42 of the front cover 4, achieve a narrow frame, and make the frame more inconspicuous.

EXAMPLE 1

Figure 4:
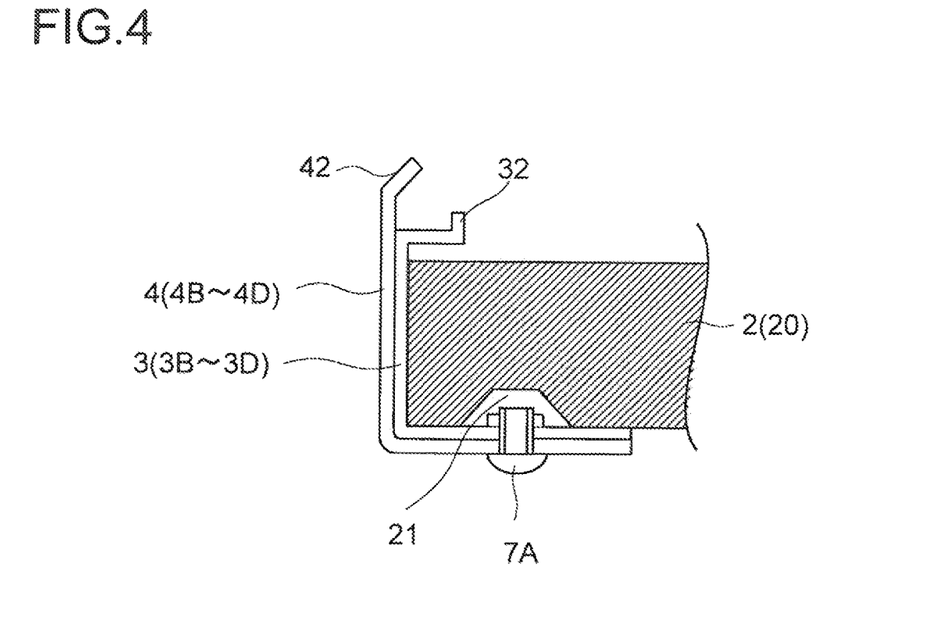
FIG. 4 is an enlarged view of a main portion showing an assembly structure of a front cabinet and front cover.
Figure 5:
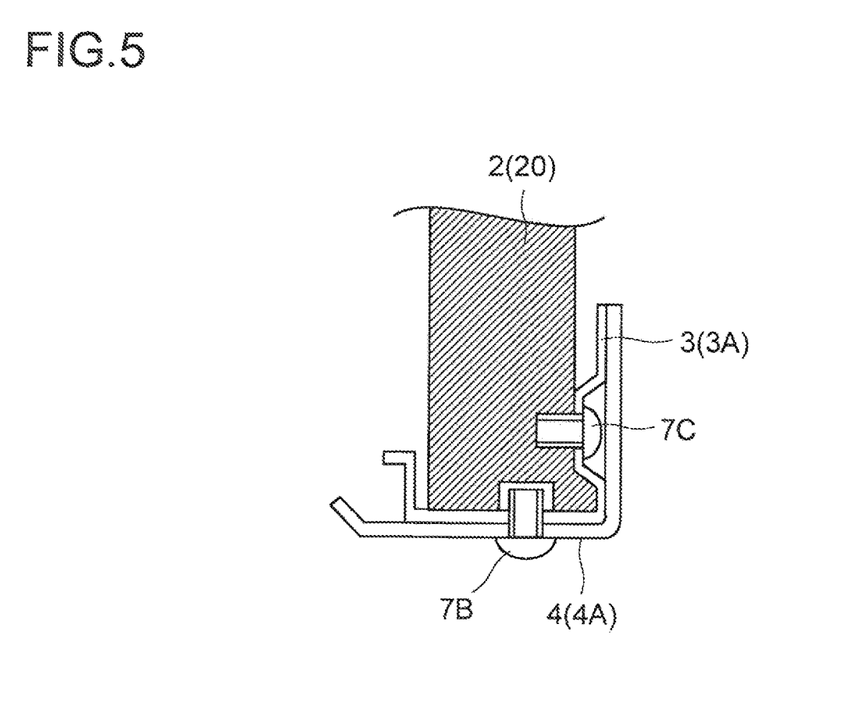
FIG. 5 is an enlarged view of a main portion showing an assembly structure of a front cabinet and front cover.

Next, by using FIG. 4 and FIG. 5, the assembly structure according to the present embodiment is described as an example 1 in which the front cabinet 3 and the front cover 4 are mounted onto the backlight unit 2 that is rectangular in a plan view.

First, the front cabinet 3 (3A-3D) having the C-shape in cross-section is fitted to each edge of the backlight unit 2 that has a predetermined thickness in the plan view. Next, the lens cover 5 is fitted to the lens fixing claw 32 disposed on each edge of the front cabinet 3 (3A-3D) to be mounted. Thereafter, the front cover 4 (4A-4D) having the C-shape in cross-section is mounted onto the outer portion of the front cabinet 3 (3A-3D).

At this time, the pressing piece 42 disposed on each front cover 4 (4A-4D) presses the circumferential edge portion of the lens cover 5, and the lens fixing claw 32 and the pressing piece 42 grip the lens cover 5. Then, the front cabinet 3 (3A-3D) and the front cover 4 (4A-4D) are unitarily fixed with a screw, that is, joint-fastened to each other.

The joint-fastening is achievable by disposing a screw fixing portion at portions opposing a side surface and rear surface of the backlight unit 2. For example, as shown in FIG. 4, the joint-fastening may be performed by disposing the screw fixing portion at the portion opposing the rear surface of the backlight unit 2 and unitarily fixing by using a screw 7A. It is preferable that the screw fixing portion is disposed on at least one place of each edge or preferably on two places in a longitudinal direction. Besides, it is preferable that an escape portion 21 is disposed in the backlight unit 2 opposing the screw fixing portion. In the present embodiment, the three edges except for the lower edge portion fix only the front cabinet 3 (3B-3D) and the front cover 4 (4B-4D) to each other.

As shown in FIG. 5, the lower edge portion fixes the front cabinet 3 (3A) and the front cover 4 (4A) to each other by using a setscrew 7B, and fixes the front cabinet 3 (3A) to the backlight unit 2 by using a setscrew 7C. Also the screw fixing portion can be disposed at a plurality of places of the side surface or rear surface of the backlight unit 2. For example, the screw fixing portion for fixing the front cabinet 3 (3A) to the backlight unit 2 may be disposed at the portion of the rear surface of the backlight unit 2, and the screw fixing portion for fixing the front cabinet 3 (3A) and the front cover 4 (4A) to each other may be disposed at the portion opposing the side surface of the backlight unit 2.

By employing the above structure, the front cabinet 3 (3A) and the front cover 4 (4A) on the lower edge portion are fixed to the backlight unit 2, but the remaining three edges are free with respect to the backlight unit 2. Because of this, for example, even if the lens cover 5 is expanded and shrunk to be deformed by heat, the front cabinet 3 and the front cover 4 are only displaced following the displacement, and it is possible to prevent a main body of the backlight unit 2 from being influenced.

As described above, in the assembly structure according to the present structure, the front cabinet 3 having the C-shape in cross-section is fitted to each edge of the backlight unit 2, on which the lens cover 5 is mounted to perform the assembly. Accordingly, the assembly becomes easy. Besides, the front cover 4 having the C-shape in cross-section is mounted onto the outer portion of the front cabinet 3, the lens cover 5 is pressed via the pressing piece 42, the front cabinet 3 (3A-3D) and the front cover 4 (4A-4D) are unitarily fixed by the screw. Accordingly, it is possible to obtain the light source device 1 that has a stable frame strength.

Therefore, according to the present embodiment, the frame structure is obtained which is able to show a mechanical strength of the device unit that is obtained by unitarily mounting the front cabinet 3, the front cover 4 and the lens cover 5 onto the backlight unit 2.

Besides, by employing a device structure in which the circumferential edge portion of the lens cover 5 is pressed and held by the pressing piece 42 of the front cover 4, it is possible to make the frame portion as small as about the width of the pressing piece 42 of the front cover 4. Further, by disposing the inclined surface 52 onto the circumferential edge portion of the lens cover 5 and inclining the pressing piece 42 obliquely upward, it is possible make the visual width L1 of the pressing piece 42 small and make the frame portion more inconspicuous.

Figure 6:
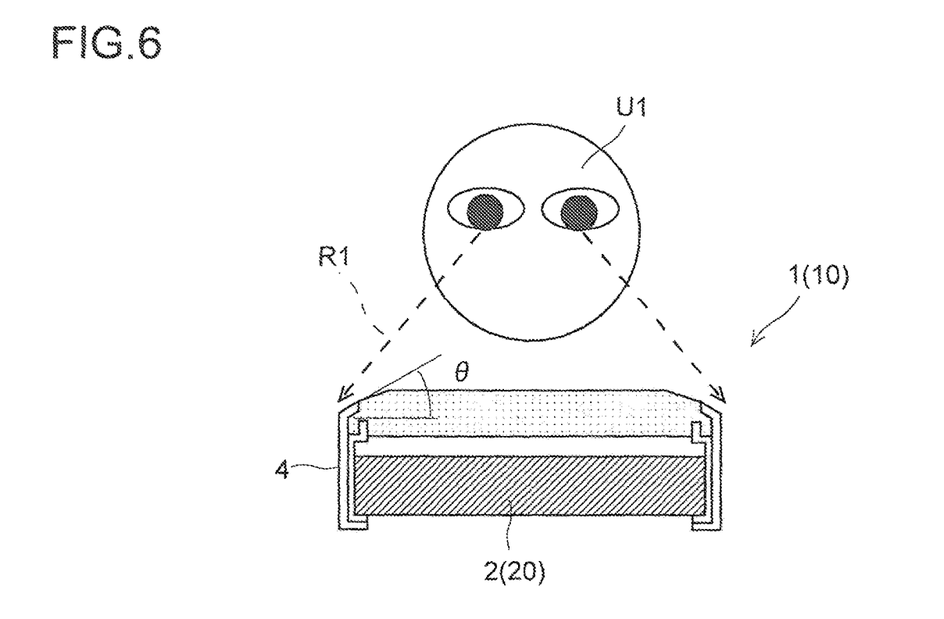
FIG. 6 is a view for describing an effect obtained by inclining a pressing piece of a front cover diagonally upward.

In other words, as shown in FIG. 6, by inclining the pressing piece 42 by an angle θ obliquely upward, an inclined surface along a watching line R1 of a user U1 is obtained, whereby the frame width comes to look narrower. It is clear that the inclination angle θ is more than 0° and less than 90°, but may be a suitable inclination degree in accordance with an inclination angle of the circumferential edge portion of the lens cover 5.

EXAMPLE 2

Figure 7:
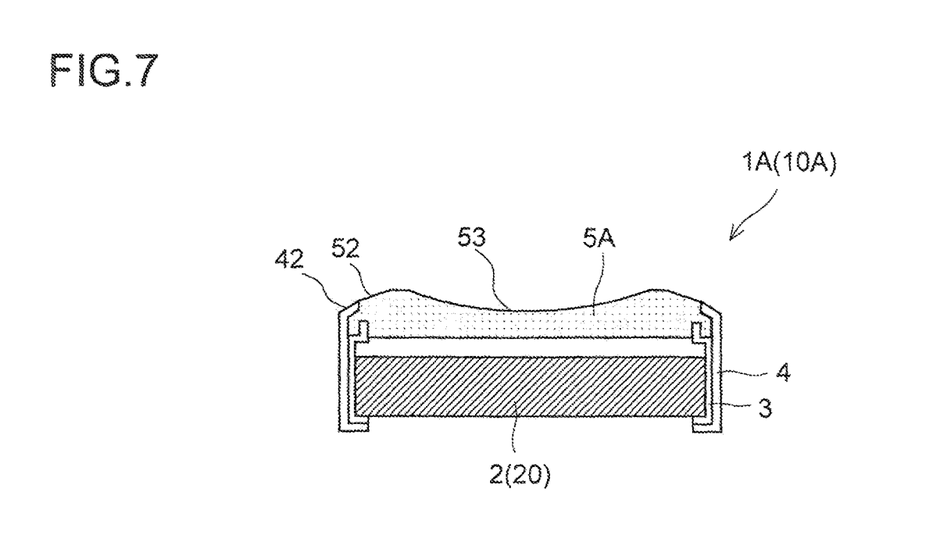
FIG. 7 is a schematic cross-sectional view showing a structure in which a lens cover is formed into a concave lens shape.

Next, by using FIG. 7, an embodiment is described as an example 2 in which the lens cover 5 is formed into a concave lens shape.

A lens cover 5A shown in FIG. 7 is formed of a transparent resin or semitransparent resin that transmits light. Besides, as shown in the figure, by recessing a central portion into a concave lens-shaped central portion 53, it becomes possible to achieve a light weight of the lens cover 5A and produce a three dimensional feeling by means of a concave lens effect. Besides, it is possible to decrease the mechanical strength required for the front cabinet 3 and the front cover 4, it becomes possible to use a thinner plate thickness and also becomes possible to achieve a narrower frame.

Even in this case, the inclined surface 52 of the circumferential edge portion may have the same thickness and shape as the above flat plate-shaped lens cover 5, which is the frame structure that is able to achieve the narrow frame by means of the lens effect of the inclined surface 52 and the pressing piece 42 inclined obliquely upward. Besides, by using polycarbonate resin, an excellent mechanical strength is obtained and impact resistance is achieved. Further, it is possible to prevent the lens cover 5 from coming off and also possible to improve flame retardancy.

As described above, a light source device 1A, which is composed by unitarily mounting the front cabinet 3, the front cover 4 and the lens cover 5A onto the backlight unit 2, is able to achieve a narrow frame and a light weight of the lens cover 5A, and produce the three dimensional feeling by means of the concave lens effect.

Besides, a display device 10A, which is composed by unitarily mounting the front cabinet 3, the front cover 4 and the lens cover 5A onto the liquid crystal panel unit 20, is able to achieve a narrow frame and a light weight of the lens cover 5A, and display an image that has the three dimensional feeling due to the concave lens effect.

EXAMPLE 3

Figure 8:
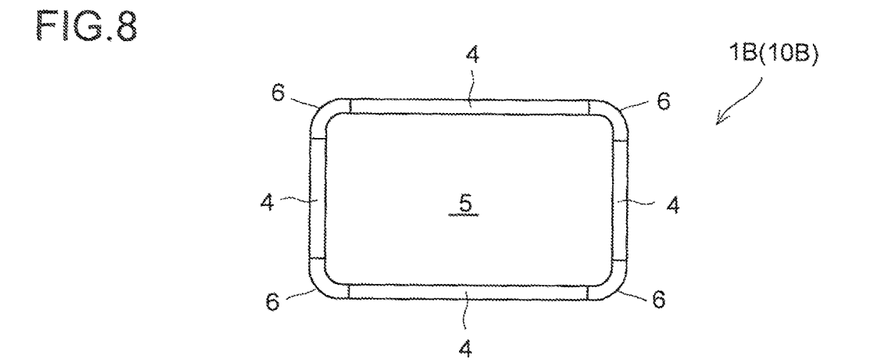
FIG. 8 is a front view showing appearances of a light source device and display device in which a corner part is mounted.
Figure 9:
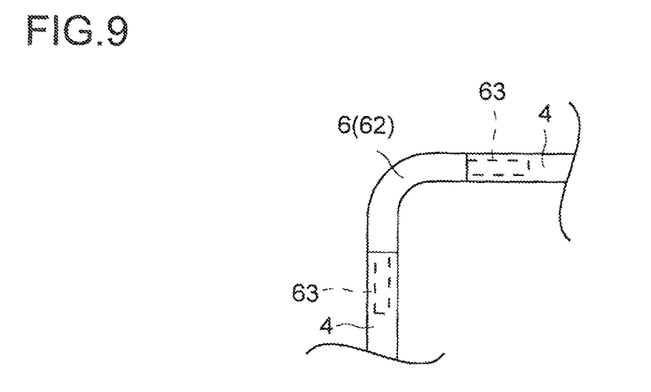
FIG. 9 is an enlarged view of a main portion showing a portion where a corner part is mounted.
Figure 10:
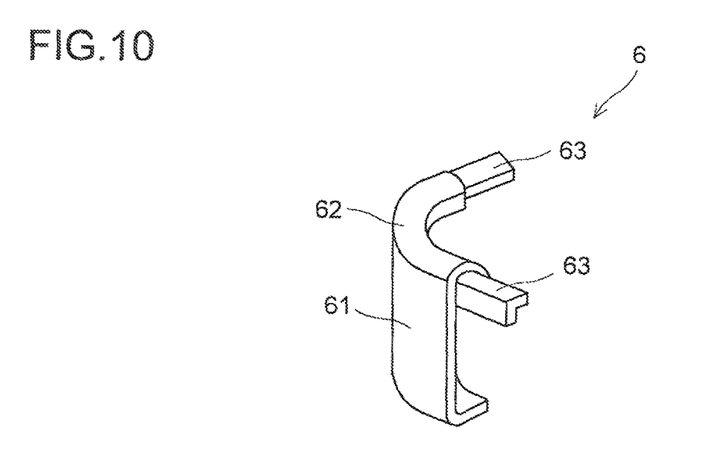
FIG. 10 is an appearance perspective view showing an example of a corner part.

Next, by using FIG. 8 to FIG. 10, an embodiment is described as an example 3 in which a corner part is disposed at a corner portion.

The examples described above have the structure in which the frame portion is formed by using the pressing piece 42 of the front cover 4 disposed on each edge, but the present example has a structure in which a longitudinal dimension of the pressing piece 42 is shortened, and a corner part 6 is mounted between the adjacent front covers 4 at the corner portion.

Because of this, as shown in FIG. 8, the light source device including the rectangular backlight unit 2 serves as a light source device 1B that has an appearance in which the corner part 6 is disposed at the four corners of the rectangular shape. Besides, as shown in FIG. 8, the display device including the rectangular liquid crystal panel unit 20 serves as a display device 10B that has an appearance in which the corner part 6 is disposed at the four corners of the rectangular shape.

In any case, in the structure in which the corner part 6 is mounted, by using the corner part 6 having a suitable roundness, it is possible to obtain a round appearance that is able to produce a soft and luxurious feeling.

Besides, as shown in FIG. 9, it is preferable that the corner part 6 includes a lens cover covering portion 62 that covers the corner portion of the lens cover 5 and is exposed at the corner portion in the front view; and a front cover engagement portion 63 that is hidden by the front cover 4. For example, as shown in FIG. 10, it is possible to form the corner part 6 by means of a resin-formed product that unitarily includes: a unit corner portion covering portion 61 which is disposed at a unit corner portion side portion of the backlight unit and liquid crystal panel unit; the lens cover covering portion 62; and the front cover engagement portion 63.

For example, the unit corner portion covering portion 61 is fitted to the unit corner portion of the butting portion of the front cabinet 3, the lens cover covering portion 62 is mounted to cover the corner portion of the lens cover 5, and the front cover 4 is mounted pressing the front cover engagement portion 63, whereby it is possible to fix the corner part 6 to a predetermined portion. According to this structure, it is possible to improve the appearance of the corner portion of the light source device 1B and display device 10B, and because a gap does not occur between the front covers 4, it is possible to improve a dustproof characteristic. Besides, even if the lens cover 5 is expanded and shrunk by heat, stable holding becomes possible and it is possible to reduce stress on the main body.

EXAMPLE 4

Next, an embodiment, in which a material of the front cabinet 3 and a material of the front cover 4 are studied, is described as an example 4.

The front cabinet 3 has the frame structure having the C-shape in cross-section that is fitted to each edge of the backlight unit 2. Besides, as described above, the structure is employed which includes the main body portion 31 having the C-shape in cross-section and the lens fixing claw 32 that protrudes upward from the upper end portion of the main body portion 31.

The front cabinet 3 having such a frame structure can be produced as a resin-formed product. Besides, the front cabinet can be produced as a sheet metal structure that uses a metal plate. For example, a resin-formed product can achieve a light weight. Besides, by using a resin having a low thermal conductivity, heat is not conducted to a portion where people touch, and it is possible to curb a burn caused by touching.

Also the front cover 4, which has the structure that includes the main body portion 41 having the C-shape in cross-section; and the pressing piece 42 that is inclined obliquely upward from the upper end portion of the main body portion 41, can be produced as a resin product or a sheet metal product. For example, a resin product can achieve a light weight and curb a burn caused by touching.

Besides, in the case of the resin product, a PC (polycarbonate) material is preferable. A polycarbonate product improves the impact resistance and flame retardancy, and becomes preferable as an exterior product.

Either one of the front cabinet 3 and the front cover 4 may be a sheet metal product. Besides, both may be a sheet metal product. For example, by using a sheet metal structure formed of SUS, it is possible to improve the rigidity and mechanical strength and thereby better the durability.

Besides, by forming both of SUS to improve the mechanical strength, it becomes possible to produce the frame structure having the C-shape in cross-section by using a sheet metal having a thinner thickness and to achieve a narrower frame. Besides, it becomes possible to show an appearance excellent in design by using a lustrous metal surface.

Hereinbefore, as the light source device 1 according to the present invention, the structure is described as an example which is obtained by unitarily mounting the front cabinet 3 and the front cover 4 onto the rectangular backlight unit 2 via the lens cover 5. However, the scope of the present invention is not indicated by the above description of the embodiments but by the claims, and all modifications within the scope of the claims and the meaning equivalent to the claims are covered.

For example, the backlight unit 2 may be triangular, or polygonal having four corners or more. Besides, a round shape may be used, and a structure may be employed in which the front cabinet 3 and the front cover 4 are unitarily mounted via the lens cover 5 onto each of regions, that is, edges obtained by dividing the outer circumference of the backlight unit 2.

Besides, the structure is described as an example in which the corner part 6 is mounted on the four corner portions of the rectangular shape, but in any appearance shape, a structure may be employed in which the outer circumferential portion is divided into a plurality of edges; and the corner part 6 having a predetermined shape is mounted on the butting portion of each front cabinet 3.

As described above, in the light source device 1 according to the present invention, the structure is employed in which the front cabinet 3 and front cover 4 having the C-shape in cross-section are mounted on the outer circumferential portion of the backlight unit 2; the engagement groove portion 51 is engaged with the lens fixing claw 32 disposed on the front cabinet 3 to mount the lens cover 5; and the circumferential edge portion of the lens cover 5 is pressed by the pressing piece 42 of the front cover 4. Accordingly, it is possible to obtain the light source device 1 having the assembly structure that can make the frame portion as small as about the width of the pressing piece 42 of the front cover 4, achieve the narrow frame, and make the frame more inconspicuous.

Besides, in the display device 10 according to the present invention, the structure is employed in which the front cabinet 3 and front cover 4 having the C-shape in cross-section are mounted on the outer circumferential portion of the liquid crystal panel unit 20; the engagement groove portion 51 is engaged with the lens fixing claw 32 disposed on the front cabinet 3 to mount the lens cover 5; and the circumferential edge portion of the lens cover 5 is pressed by the pressing piece 42 of the front cover 4. Accordingly, it is possible to obtain the display device 10 having the assembly structure that can make the frame portion as small as about the width of the pressing piece 42 of the front cover 4, achieve the narrow frame, and make the frame more inconspicuous.

As described above, a device of the present invention that solves the problems is the light source device 1 composed by unitarily mounting the front cabinet 3 and the front cover 4 onto the backlight unit 2, the light source device 1 includes: the front cabinet 3 that is formed into the C-shape in cross-section fittable to each edge of the backlight unit 2 and is provided with the lens fixing claw 32; the lens cover 5 that has the engagement groove portion 51 into which the lens fixing claw 32 is fitted, the lens cover 5 being mounted on the surface of the backlight unit 2: and the front cover 4 that is formed into the C-shape in cross-section fitted to and mounted on the outer portion of the front cabinet 3, and is provided with the pressing piece 42 that engages with the circumferential edge portion of the lens cover 5.

As to an effect corresponding to this device, the device structure is employed, in which the front cabinet 3 and front cover 4 having the C-shape in cross-section are mounted on the outer circumferential portion of the backlight unit 2; the engagement groove portion 51 is engaged with the lens fixing claw 32 disposed on the front cabinet 3 to mount the lens cover 5; and the circumferential edge portion of the lens cover 5 is pressed by the pressing piece 42 of the front cover 4. Accordingly, it is possible to obtain the light source device 1 that can make the frame portion as small as about the width of the pressing piece 42 of the front cover 4.

Besides, as to a device of the present invention that solves the problems, in the light source device having the above structure, the front cabinet 3 having the C-shape in cross-section is fitted to and mounted onto each edge of the backlight unit 2; the engagement groove portion 51 is engaged with the lens fixing claw 32 to mount the lens cover 5 onto the surface of the backlight unit 2; further, the front cover 4 having the C-shape in cross-section is mounted onto the outer portion of the front cabinet 3, and the front cabinet 3 and the front cover 4 are unitarily fixed to each other by using a screw; and the lens fixing claw 32 and the pressing piece 42 grip the lens cover 5 to form the mount structure. As to effects corresponding to this device, the front cabinet 3 having the C-shape in cross-section is fitted to each edge of the backlight unit 2, onto which the lens cover 5 is mounted to perform the assembly. Accordingly, the assembly becomes easy. Besides, the front cover 4 having the C-shape in cross-section is mounted onto the outer portion of the front cabinet 3, the lens cover 5 is pressed via the pressing piece 42, and the front cabinet 3 and the front cover 4 are unitarily foxed to each other by using a screw. Accordingly, it is possible to obtain the light source device 1 that has the stable frame strength.

Besides, as to a device of the present invention that solves the problems, in the light source device having the above structure, the backlight unit 2 has the rectangular shape, and the front cabinet 3 on one edge is fixed to the backlight unit 2 by using a screw. As to effects corresponding to this device, the front cabinet 3 on the one edge is fixed to the backlight unit 2 by the screw, and the front cabinets 3 on the other edges are only fitted to the backlight unit 2. Accordingly, the assembly structure is obtained which is easy to assemble and not influenced by expansion and shrinkage caused by heat.

Besides, as to a device of the present invention that solves the problems, in the light source device having the above structure, the pressing piece 42 is inclined diagonally upward with respect to the surface of the backlight unit 2 as the horizontal direction. As to effects corresponding to this device, it is possible to make the width of the frame portion small in the front view. Accordingly, it is possible to make the frame more inconspicuous and achieve the narrow frame.

Besides, as to a device of the present invention that solves the problems, in the light source device having the above structure, the lens cover 5 is formed into the concave lens shape. As to effects corresponding to this device, it is possible to achieve the light weight of the lens cover 5, and becomes possible to produce the three dimensional feeling by means of the concave lens effect. Besides, it is possible to reduce the mechanical strength of the front cabinet 3 and front cover 4, and also possible to achieve the narrow frame.

Besides, as to a device of the present invention that solves the problems, in the light source device having the above structure, the lens cover 5 is formed of polycarbonate resin. As to effects corresponding to this device, it is possible to achieve the light weigh because of the resin product, and by forming the lens cover of polycarbonate, the impact resistance and flame retardancy improve, and the lens cover becomes preferable as an exterior product.

Besides, as to a device of the present invention that solves the problems, in the light source device having the above structure, the front cabinet 3 is composed of the sheet metal formed of SUS. As to effects corresponding to this device, it is possible to improve the rigidity and mechanical strength and thereby better the durability.

Besides, as to a device of the present invention that solves the problems, in the light source device having the above structure, the front cover 4 is composed of the sheet metal formed of SUS. As to effects corresponding to this device, it is possible to improve the rigidity and mechanical strength and thereby better the durability.

Besides, as to a device of the present invention that solves the problems, in the light source device having the above structure, the corner part 6, which includes the unit corner portion covering portion 61, the lens cover covering portion 62 and the front cover engagement portion 63, is mounted on the four corners of the rectangular shape. As to effects corresponding to this device, it is possible to improve the appearance of the corner portion, and because a gap does not occur between the front covers 4, it is possible to improve the dustproof characteristic.

Besides, a device of the present invention that solves the problems is the display device 10 composed by unitarily mounting the front cabinet 3 and the front cover 4 onto the liquid crystal panel unit 20 that includes the backlight, the display device 10 includes: the front cabinet 3 that is formed into the C-shape in cross-section fitted to each edge of the liquid crystal panel unit 20 and is provided with the lens fixing claw 32; the lens cover 5 that has the engagement groove portion 51 into which the lens fixing claw 32 is fitted, the lens cover 5 being mounted on the surface of the liquid crystal panel unit 20; and the front cover 4 that is formed into the C-shape in cross-section fitted to and mounted onto the outer portion of the front cabinet 3, and is provided with the pressing piece 42 that engages with the circumferential edge portion of the lens cover 5.

As to effects corresponding to this device, the device structure is employed, in which the front cabinet 3 and front cover 4 having the C-shape in cross-section are mounted onto the outer circumferential portion of the liquid crystal panel unit 20; the engagement groove portion 51 is engaged with the lens fixing claw 32 disposed on the front cabinet 3 to mount the front cover 5; and the circumferential edge portion of the lens cover 5 is pressed by the pressing piece 42 of the front cover 4. Accordingly, it is possible to obtain the display device 10 that can make the frame portion as small as about the width of the pressing piece 42 of the front cover 4.

Besides, as to a device of the present invention that solves the problems, in the display device having the above structure, the liquid crystal panel unit 20 has the rectangular shape, and the corner part 6, which includes the unit corner portion covering portion 61, the lens cover covering portion 62 and the front cover engagement portion 63, is mounted on the four corners of the rectangular shape. As to effects corresponding to this device, it is possible to well hold the lens cover 5 to improve the appearance even if the lens cover 5 is expanded and shrunk by heat, and because a gap does not occur between the front covers 4, it is possible to improve the dustproof characteristic.

As described above, according to the light source device and display device of the present invention, the assembly structure is obtained which is easy to assemble, can achieve the narrow frame, and make the frame more inconspicuous.

INDUSTRIAL APPLICABILITY

Because of this, the light source device and display device according to the present invention become preferably applicable to a light source device and display device of surface light-emitting type which require a narrow frame.

REFERENCE SIGNS LIST 1 light source device
2 backlight unit
3 (3A-3D) front cabinet
4 (4A-4D) front cover
5 lens cover
6 corner part
10 display device
20 liquid crystal panel unit
32 lens fixing claw
42 pressing piece
51 engagement groove portion
52 inclined surface (circumferential edge portion)
53 concave lens-shaped central portion
61 unit corner portion covering portion
62 lens cover covering portion
63 front cover engagement portion

The invention claimed is:

1. A light source device, comprising:
a front cabinet that has a C-shape in cross-section fittable to each edge of a backlight unit and is provided with a lens fixing claw,
a lens cover including an engagement groove portion into which the lens fixing claw is fitted, the lens cover being mounted on a surface of the backlight unit, and
a front cover that has a C-shape in cross-section that is fitted to and mounted onto an outer portion of the front cabinet, and is provided with a pressing piece that engages with a circumferential edge portion of the lens cover, wherein
the front cabinet is fitted to and mounted onto each edge of the backlight unit,
the engagement groove portion is engaged with the lens fixing claw to mount the lens cover onto the surface of the backlight unit,
the front cover is mounted onto the outer portion of the front cabinet, and the front cover and the front cabinet are unitarily fixed to each other with a screw, and
the lens fixing claw and the pressing piece grip the lens cover to define a mount structure.

2. The light source device according to claim 1, wherein the backlight unit has a rectangular shape, the front cabinet and the front cover are mounted onto each of four edges, and the front cabinet on one edge is fixed to the backlight unit by using a screw.

3. The light source device according to claim 2, wherein a corner portion, which includes a corner portion covering portion, a lens cover covering portion and a front cover engagement portion, is mounted on four corners of the rectangular shape.

4. The light source device according to claim 1, wherein the pressing piece is inclined diagonally upward with respect to the backlight unit surface as a horizontal direction.

5. The light source device according to claim 1, wherein the lens cover has a concave lens shape.

6. The light source device according to claim 1, wherein the lens cover is made of polycarbonate resin.

7. The light source device according to claim 1, wherein the front cabinet is composed of a sheet metal made of stainless use steel.

8. The light source device according to claim 1, wherein the front cover is composed of a sheet metal made of stainless use steel.

9. A display device, comprising:
a front cabinet that has a C-shape in cross-section fitted in each edge of a liquid crystal panel and is provided with a lens fixing claw,
a lens cover including an engagement groove portion into which the lens fixing claw is fitted, the lens cover being mounted on a surface of the liquid crystal panel, and
a front cover that has a C-shape in cross-section fitted to and mounted onto an outer portion of the front cabinet, and is provided with a pressing piece that engages with a circumferential edge portion of the lens cover, wherein
the front cabinet is fitted to and mounted onto each edge of a backlight,
the engagement groove portion is engaged with the lens fixing claw to mount the lens cover onto the surface of the backlight,
the front cover is mounted onto the outer portion of the front cabinet, and the front cover and the front cabinet are unitarily fixed to each other with a screw, and
the lens fixing claw and the pressing piece grip the lens cover to define a mount structure.

10. The display device according to claim 9, wherein the liquid crystal panel has a rectangular shape, and
a corner portion, which includes a corner portion covering portion, a lens cover covering portion and a front cover engagement portion, is mounted on four corners of the rectangular shape.

* * * * *